United States Patent
Diaz et al.

(10) Patent No.: US 8,419,828 B2
(45) Date of Patent: Apr. 16, 2013

(54) MULTI-STAGE MEMBRANE SEPARATION PROCESS

(75) Inventors: Zaida Diaz, Katy, TX (US); Henricus Abraham Geers, Rijswijk (NL); Ewout Martijn Van Jarwaarde, Amsterdam (NL); Arian Nijmeijer, Amsterdam (NL); Eric Johannes Puik, Rijswijk (NL)

(73) Assignee: Shell Oil Company, Houston, TX (US)

( * ) Notice: Subject to any disclaimer, the term of this patent is extended or adjusted under 35 U.S.C. 154(b) by 280 days.

(21) Appl. No.: 12/811,793

(22) PCT Filed: Jan. 7, 2009

(86) PCT No.: PCT/EP2009/050097
§ 371 (c)(1),
(2), (4) Date: Oct. 28, 2010

(87) PCT Pub. No.: WO2009/087156
PCT Pub. Date: Jul. 16, 2009

(65) Prior Publication Data
US 2011/0041687 A1  Feb. 24, 2011

Related U.S. Application Data

(60) Provisional application No. 61/019,669, filed on Jan. 8, 2008.

(51) Int. Cl.
*B01D 53/22* (2006.01)

(52) U.S. Cl.
USPC ............... 95/49; 95/43; 95/45; 95/51; 96/4; 96/7; 96/9

(58) Field of Classification Search ............... 95/43, 45, 95/49, 51; 96/4, 7
See application file for complete search history.

(56) References Cited

U.S. PATENT DOCUMENTS

| | | | | |
|---|---|---|---|---|
| 2,617,493 A | * | 11/1952 | Jones | 95/49 |
| 4,264,338 A | * | 4/1981 | Null | 95/47 |
| 4,589,896 A | * | 5/1986 | Chen et al. | 92/28 |
| 4,639,257 A | * | 1/1987 | Duckett et al. | 62/624 |
| 4,894,068 A | * | 1/1990 | Rice | 95/51 |
| 4,990,168 A | * | 2/1991 | Sauer et al. | 62/624 |
| 5,089,033 A | * | 2/1992 | Wijmans | 95/39 |
| 5,332,424 A | * | 7/1994 | Rao et al. | 95/47 |
| 5,407,466 A | | 4/1995 | Lokhandwala et al. | 95/49 |

(Continued)

*Primary Examiner* — Jason M Greene
*Assistant Examiner* — Anthony Shumate

(57) ABSTRACT

The invention concerns a process for the removal of gaseous acidic contaminants, especially carbon dioxide and/or hydrogen sulphide, in two or more stages from a gaseous hydrocarbonaceous feedstream (1) comprising hydrocarbons and said acidic contaminants, using one or more membranes in each separation stages. The gaseous hydrocarbonaceous feedstream is especially a natural gas stream. The process is especially suitable for feedstreams comprising very high amounts of acidic contaminants, especially carbon dioxide, e.g. more than 25 vol. %, or even more than 45 vol. %. In a first stage (2) a pure or almost pure stream of acidic contaminants is separated from the feedstream, the acidic contaminants (4) stream suitably containing less than 5 vol % of hydrocarbons. The remaining stream (3) comprises the hydrocarbons and still a certain amount of gaseous acidic contaminants. In a second stage (5) a pure or almost pure stream of hydrocarbons (8) is separated from the remaining stream, where after the then remaining stream (6) is combined with the feed for the first stage (1), the hydrocarbon stream suitably containing less than 5 vol % of acidic contaminants.

20 Claims, 1 Drawing Sheet

U.S. PATENT DOCUMENTS

| | | | |
|---|---|---|---|
| 5,753,011 A * | 5/1998 | Sircar et al. | 95/45 |
| 6,168,649 B1 * | 1/2001 | Jensvold et al. | 95/47 |
| 6,565,626 B1 * | 5/2003 | Baker et al. | 95/47 |
| 6,572,678 B1 * | 6/2003 | Wijmans et al. | 95/47 |
| 6,648,944 B1 | 11/2003 | Baker et al. | 95/39 |
| 7,537,641 B2 * | 5/2009 | Lokhandwala et al. | 95/45 |
| 8,192,524 B2 * | 6/2012 | Chinn et al. | 95/51 |
| 2004/0099138 A1 | 5/2004 | Karode et al. | 95/214 |
| 2006/0042463 A1 | 3/2006 | Frantz | 95/49 |
| 2007/0272079 A1 | 11/2007 | Malsam et al. | 95/51 |
| 2011/0009684 A1 * | 1/2011 | Diaz et al. | 585/818 |

* cited by examiner

MULTI-STAGE MEMBRANE SEPARATION PROCESS

PRIORITY CLAIM

The present application claims priority of U.S. Provisional Patent Application Ser. No. 61/019,669 filed 8 Jan. 2008.

The present application claims priority from PCT application PCT/EP2009/050097, published as WO 2009/087156 A1.

FIELD OF THE INVENTION

The present invention concerns a process for the removal in two or more stages of gaseous acidic contaminants, especially carbon dioxide and/or hydrogen sulphide, from a gaseous hydrocarbonaceous feedstream comprising hydrocarbons and said acidic contaminants, using one or more membranes in each separation stage.

BACKGROUND OF THE INVENTION

Natural gas is a major energy source. Its importance has increased in the past decades, and it is expected that its significance will grow further in next decades. A main concern in the natural gas production is the presence of acidic contaminants. Many natural gas fields are known that contain a few percents of acidic contaminants, and many gas fields are known to comprise large amounts of acidic contaminants, up till 50 vol % or even more. In general, the presence of several volume percents of carbon dioxide and/or hydrogen sulphide is acceptable, as conventional technologies are known to remove such amounts of acidic contaminants from the hydrocarbon fraction. Suitable conventional techniques are the absorption of acidic contaminants with aqueous amine solutions or with cold methanol, including the regeneration of the absorption liquids. The removal of higher amounts of acidic contaminants from natural gas, e.g. 10 vol percents or more, would result in very large removal units, including many stages, requiring very high investment and operational costs.

Thus, there is a need for new techniques for the easy and quick removal of acidic contaminants from natural gas streams containing high mounts of these compounds. In the past, the use of membranes has been considered for the removal of the acidic contaminants. However, up till now no process has be developed for the quick and easy removal of acidic contaminants from natural gas streams containing high mounts of these compounds.

SUMMARY OF THE INVENTION

The present invention, now, describes a integrated multi-stage process for the removal of acidic contaminants from natural gas using two or more membranes stages, the membranes having a (much) higher permeance for the acidic components than for hydrocarbons, especially methane. In a first stage a relative pure acidic contaminants stream is obtained by removing all or almost all of the hydrocarbons from the natural gas stream. The hydrocarbons containing stream, however, will contain a considerable amount of acidic contaminants. In a second step, a pure or almost pure hydrocarbons stream is extracted from the hydrocarbons containing stream obtained in the first stage. The remaining stream from the second stage, containing hydrocarbons as well as acidic contaminants, is recycled to the natural gas feed stream that is used for the first stage.

In the above way, two streams are obtained, one stream a clean or almost clean acidic contaminants containing stream, the other stream a clean or almost clean natural gas stream (or hydrocarbon stream). The first stream may be used for instance for the production of sulphur or sulphur compounds, or may be used in an enhanced oil recovery (EOR) process. The second stream, optionally after further purification using conventional means, is suitably used as pipeline gas, or is used for the production of LNG or synthesis gas, for instance to be used as feedstream for the production of hydrogen, hydrocarbons (Fischer-Tropsch), methanol, urea etc.

Thus, the present invention concerns a process for the removal of gaseous acidic contaminants from a gaseous hydrocarbonaceous feedstream comprising such gaseous acidic contaminants, the process comprising:
1) providing the hydrocarbonaceous feedstream at a pressure between 30 and 120 bara,
2) contacting the hydrocarbonaceous feedstream with a membrane to obtain a hydrocarbon rich retentate and an acidic contaminants rich permeate,
3) contacting the hydrocarbon rich retentate obtained in step 2) with a second membrane to obtain a hydrocarbon rich retentate and an acidic contaminants rich permeate,
4) compressing the acidic contaminants rich permeate obtained in step 3) up till a pressure between 30 and 120 bara, and
5) mixing the compressed permeate obtained in step 4) with the feedstream of step 1).

The gaseous hydrocarbonaceous feedstream is especially a natural gas stream. The process is especially suitable for feedstreams comprising very high amounts of acidic contaminants, especially carbon dioxide, e.g. more than 25 vol. %, or even more than 45 vol. %. In a first stage a pure or almost pure stream of acidic contaminants is separated from the feedstream, the acidic contaminants stream suitably containing less than 5 vol % of hydrocarbons. The remaining stream comprises the hydrocarbons and still a certain amount of gaseous acidic contaminants. In a second stage a pure or almost pure stream of hydrocarbons is separated from the remaining stream, where after the then remaining stream is combined with the feed for the first stage, the hydrocarbon stream suitably containing less than 5 vol % of acidic contaminants.

DETAILED DESCRIPTION

Figure 1:
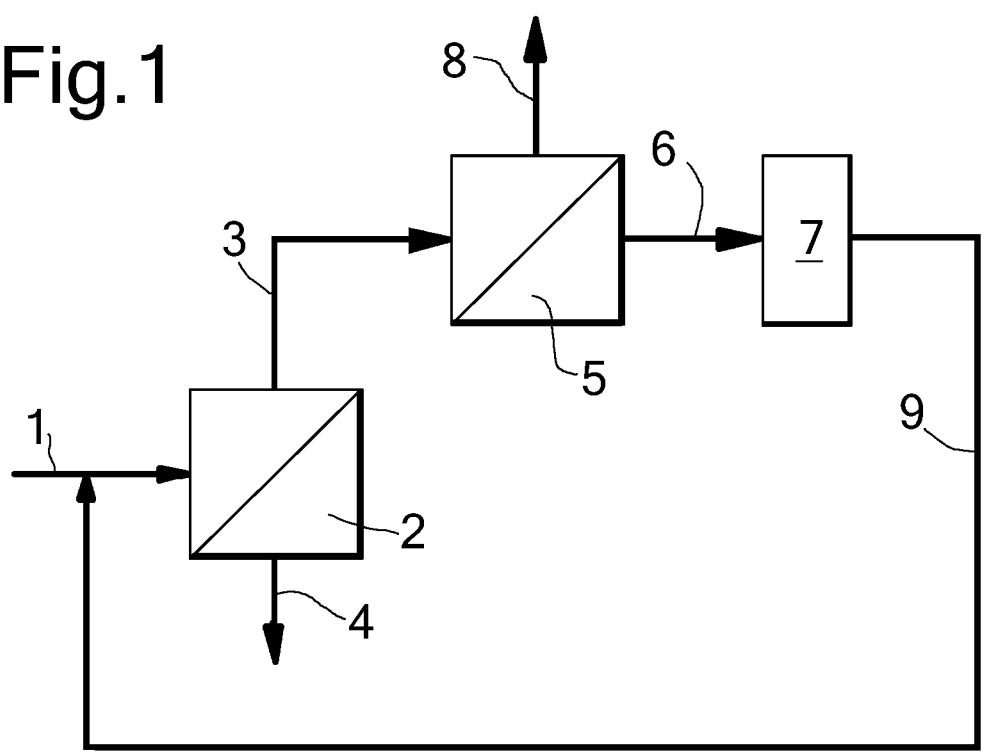
FIG. 1 shows a membrane system for processing a gas stream.

The process of the invention separates acidic contaminants containing hydrocarbons streams, especially natural gas stream, into two relatively pure streams, an acidic contaminants containing stream and a hydrocarbon stream. The process uses relatively cheap membranes. Membrane units, when compared with conventional treating processes as amine absorption including regeneration, require a relatively small operational area, require small amounts of energy, and require only little operational efforts. Also maintenance and inspection requirements are moderate.

The feedstream for the process of the invention will have a pressure between 30 and 150 bara. Especially, the feedstream has a pressure between 40 and 100 bara, preferably between 50 and 90 bara. The feedstream suitably has a temperature between −30 and 120° C., suitably between −20 and 100° C., preferably between 0 and 50° C.

The acidic contaminants in the feedstream are especially carbon dioxide and hydrogen sulphide, although also carbonyl sulphide (COS), carbon disulphide (CS2), mercaptans, sulphides and aromatic sulphur compounds may be present. Beside acidic contaminants, also inerts may be present, for instance nitrogen and noble gases as argon and helium, usually in an amount up till 20 vol %, especially up till 10 vol %.

The amount of acidic contaminants in the gaseous hydrocarbonaceous feedstream may vary within a broad range. Suitably, the amount of carbon dioxide is between 10 and 95 vol % based on the total feedstream, preferably between 15 and 75 vol %, e.g. for gaseous hydrocarbonaceous feedstream from subsurface reservoirs, or between 80 and 95 vol %, e.g. from specific recycle streams, especially EOR recycle streams. The amount of hydrogen sulphide is suitably between 0 and 45 vol % based on the total feedstream, preferably between 5 and 40 vol %.

The amount of hydrocarbons in the gaseous hydrocarbonaceous feedstream may vary within a broad range. Suitably, the feedstream comprises hydrocarbons in an amount between 5 and 90 vol % based on total feedstream, preferably between 5 and 15 vol %, e.g. for recycle streams as EOR recycle stream, or between 20 and 90 vol %, for instance for feedstreams produced from subsurface natural gas reservoirs. The hydrocarbons in the feedstream usually will contain large amounts of methane, suitably between 50 and 98 vol %, especially 60 and 95 vol %, based on the volume of the total feedstream.

Membranes to be used in the process of the present invention are known in the literature. It is advantageous to use membranes with a high selectivity for acidic contaminants as carbon dioxide and hydrogen sulphide. The selectivity is defined as the ratio of the acidic contaminants permeability over the permeability of the hydrocarbons as measured in single gas experiments. Preferably, the selectivity of the membrane in step 2) is between 10 and 200, preferably between 20 and 150.

The permeance for carbon dioxide or hydrogen sulphide of the membrane in step 2) is suitably between $10^{-10}$ and $10^{-4}$ mol/m2sPa, preferably the carbon dioxide or hydrogen sulphide permeance through the membrane in step 2) is between $10^{-9}$ and $10^{-5}$ mol/m2sPa.

The permeate obtained in step 2) suitably has a pressure between 1 and 30 bara, preferably between 5 and 25 bara. The retentate obtained in step 2) will have a pressure more or less the same as the pressure of the gaseous hydrocarbonaceous feedstream. Suitably the retentate obtained in step 2) has a pressure which is up till 10% less than the pressure of the feedstream, preferably up till 5% less.

The permeate obtained in step 2 suitably has an acidic contaminants content of >90 vol % based on the total retentate stream, preferably more than 95 vol %. It is observed that the person skilled in the art by variation of e.g. the permeance of the membrane, the contact area of the membrane and the contact time with the membrane is able to vary the purity of the permeate obtained in step 2). Suitably, the permeate in step 2) has an hydrocarbon content of less than 10 vol % based on the total retentate, preferably less than 5 vol %.

The retentate stream obtained in step 2) of the process of the present invention will contain beside the hydrocarbons, also a relatively large amount of acidic contaminants. This is due to the fact that removal of all or almost all acidic contaminants, also will result in a relatively large amount of hydrocarbons to pass through the membrane. In general it can be said that the more pure the acidic contaminants containing stream will be, the more acidic contaminants will be present in the permeate. Suitably, the retentate in step 2) has a hydrocarbons content of between 25 and 90 vol % based on the total permeate stream, preferably between 40 and 80 vol %.

The membrane to be used in step 2) of the process of the present invention may be any membrane known in the art, provided that it will have a clear selectivity for acidic contaminants. Suitably the membrane is chosen from a polyethylene oxide based membrane, preferably a polyethylene oxide based membrane comprising block-copolymers, especially PEO 600/5000 T6T6T or a cross linked PEO, a polyimide or polyaramide based membrane, a cellulose acetate based membrane, a zeolite based membrane, preferably a silica-alumina phosphate based membrane, especially, SAPO-34, a micro-porous silica membrane or a carbon molecular sieves membrane.

The membrane in step 3) may be the same membrane as used in step 2). Suitably the selectivity of the membrane in step 3) is between 10 and 200, preferably between 20 and 150.

The permeance for carbon dioxide or hydrogen sulphide of the membrane in step 3) is suitably between $10^{-10}$ and $10^{-4}$ mol/m2sPa, preferably the carbon dioxide or hydrogen sulphide permeance through the membrane in step 2) is between $10^{-9}$ and $10^{-5}$ mol/m2sPa.

The permeate obtained in step 3) suitably has a pressure between 1 and 20 bara, preferably between 5 and 10 bara. The retentate obtained in step 3) will have a pressure more or less the same as the pressure of the feedstream. Suitably the retentate obtained in step 3) has a pressure that is up till 5% less than the pressure of the feedstream, preferably up till 2% less.

The retentate obtained in step 3) suitably has a hydrocarbons content of more than 90 vol % based on total retentate stream, preferably more than 95 vol %, more preferably more than 98 vol %. Preferably the retentate in step 3) contains less than 5 vol % of acidic contaminants, preferably less than 2 vol %. It is observed that the person skilled in the art by e.g. variation of e.g. the permeance of the membrane, the contact area of the membrane and the contact time with the membrane is able to vary the purity of the permeate obtained in step 3). Suitably the permeate in step 3) has an acidic contaminant content of between 40 and 90 vol % based on the total permeate stream, preferably between 50 and 80 vol %. The permeate stream in step 3) is pressurized up till a pressure between 30 and 150 bar, especially between 40 and 100 bar. Suitably the pressure is the same pressure as the feedstream pressure.

The membrane to be used in step 3) of the process of the present invention may be any membrane known in the art, provided that it will have a clear selectivity for acidic contaminants. Suitably the membrane is chosen from the same membrane categories as defined above for step 2).

In a preferred embodiment the process of the present invention comprises obtaining the gaseous hydrocarbonaceous feedstream from a gaseous feed comprising hydrocarbons and acidic contaminants by contacting the gaseous feed with a membrane to obtain the feedstream and an acidic contaminants rich permeate. In this way the process of the present invention is preceded by a bulk separation of hydrocarbons. The acidic contaminants are especially one or more compounds selected from carbon dioxide and hydrogen sulphide. By choosing the conditions in an optimum way, a retentate will be obtained containing high or very high amounts of hydrocarbons. Suitably, the retentate has a hydrocarbon content of more than 90 vol %, preferably more than 95 vol %. The membrane to be used in this additional step may be any membrane known in the prior art, provided that it will have a clear selectivity for acidic contaminants, e.g. a selectivity of 5 or higher. Suitably the membrane is chosen from the same membrane categories as defined above for step 2). In the additional step the permeate suitably has a pressure between 1 and 30 bara, preferably between 5 and 15 bara. The permeate is suitably in a further step pressurized to the original pressure, preferably together with the permeate of step 3). The selectivity of the membrane in the additional step is suitably between 10 and 200, preferably between 20 and 150.

The permeance for carbon dioxide or hydrogen sulphide of the membrane in the additional step is suitably between $10^{-10}$ and $10^{-4}$ mol/m2sPa, preferably the carbon dioxide or hydrogen sulphide permeance through the membrane in step 2) is between $10^{-9}$ and $10^{-5}$ mol/m2sPa.

The feed for the additional step suitably has a pressure between 30 and 120 bara. Especially, the feed has a pressure between 40 and 100 bara, preferably between 50 and 90 bara. The feed suitably has a temperature between –30 and 120° C., suitably between –20 and 100° C., preferably between 0 and 50° C. The retentate in this step will have a pressure more or less the same as the pressure of the gaseous feed. Suitably the feed has a pressure up till 5% less than the pressure of the feedstream, preferably up till 2% less. The retentate suitably contains less than 10 vol % of acidic contaminants, preferably contains less than 5 vol % acidic contaminants, more preferably less than 2 vol %.

Preferably the hydrocarbons obtained in the pre-separation step are combined with the hydrocarbons obtained in step 3).

The carbon dioxide and/or hydrogen sulphide rich permeate obtained in step 2) of the process of the invention may be used for instance for enhanced oil recovery. In that case the permeate of step 2) is suitably recompressed up till a pressure suitably between 80 and 400 bara, especially between 150 and 300 bara.

The invention further relates to the use of the compressed carbon dioxide and hydrogen sulphide rich permeates produced in one or more processes of the invention in enhanced oil recovery.

The invention also relates to the use of the hydrocarbon rich retentate produced in one or more processes of the invention as pipeline gas, LNG feed or GTL feed.

A preferred embodiment of the process of the present invention comprises a pretreatment of the gaseous carbonaceous feedstream or the gaseous feed in order to remove water. This is suitably done by a glycol treatment, for instance using MEG, DEG and/or TEG, a glycerol treatment or a molsieve treatment. Further, the process may also comprise the removal of hydrocarbons higher than methane, preferably at least the C5+ fraction, more preferably also the C2-C4 fraction, before the carbon dioxide and/or the hydrogen sulphide is removed.

Figure 2:
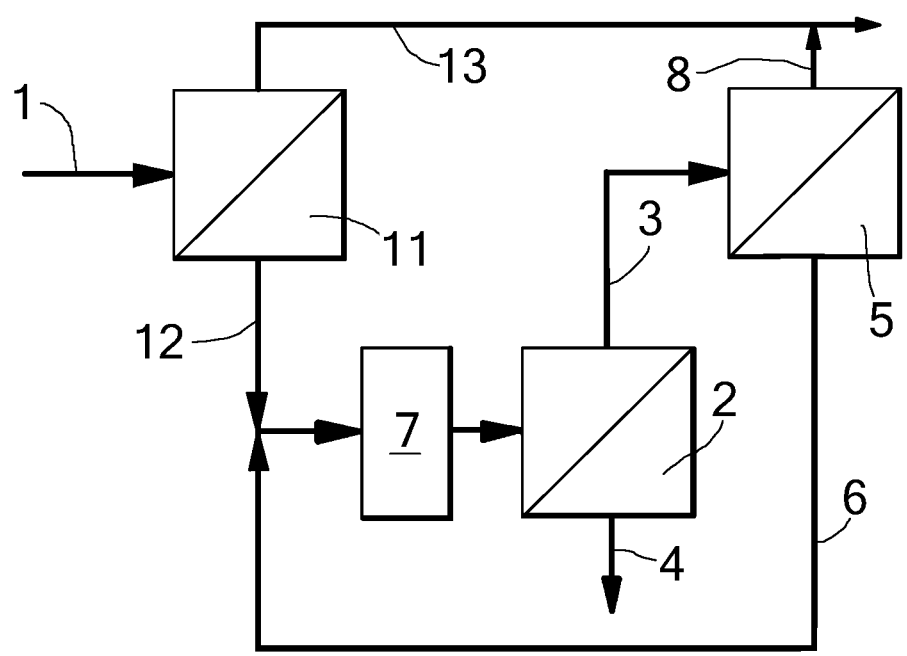
FIG. 2 shows a membrane system for processing a gas stream.

The invention is described in a non-limiting manner in FIGS. 1 and 2.

In FIG. 1 a dried, gaseous hydrocarbonaceous feedstock 1 (pressure 100 bar, temperature 20° C., 55 vol % CO2) is contacted with a membrane in unit 2. An almost pure stream of carbon dioxide (pressure 20 bar, 4 vol % hydrocarbons) is removed from the unit via line 4. The retentate stream 3, containing a mixture of hydrocarbons and carbon dioxide, is contacted with a second membrane in unit 5. An almost pure stream of hydrocarbons (pressure 95 bar, 2 vol % carbon dioxide) is removed via line 8. A permeate (pressure 20 bar) is removed via line 6 and pressurized in unit 7 and via line 9 combined with feedstock 1.

In FIG. 2 a dried, gaseous hydrocarbonaceous feedstream comprising carbon dioxide (15 vol %) and hydrogen sulphide (10 vol %) is contacted with membrane unit 11 to remove a pure stream of hydrocarbons (1 vol % of carbon dioxide, 1 vol % of hydrogen sulphide) via line 13. The retentate 12 is pressurized in unit 7 and the compressed feed is treated in the same way as has been described in FIG. 1. The pure hydrocarbon stream 8 is combined with stream 13. The retentate stream 6 is combined with stream 12 before pressurization. Optionally stream 12 may be pressurized in a separate unit, followed by combination of the pressurized stream 6 and 12.

That which is claimed is:

1. A process for the removal of gaseous acidic contaminants from a gaseous hydrocarbonaceous feedstream comprising such gaseous acidic contaminants, the process comprising:
   1) providing the hydrocarbonaceous feedstream at a pressure between 30 and 120 bara,
   2) contacting the hydrocarbonaceous feedstream with a membrane to obtain a hydrocarbon rich retentate and an acidic contaminants rich permeate,
   3) contacting the hydrocarbon rich retentate obtained in step 2) with a second membrane to obtain a hydrocarbon rich retentate and an acidic contaminants rich permeate,
   4) compressing the acidic contaminants rich permeate obtained in step 3) up till a pressure between 30 and 120 bara, and
   5) mixing the compressed permeate obtained in step 4) with the feedstream of step 1)
      further comprising obtaining the hydrocarbonaceous feedstream from a gaseous feed comprising hydrocarbons and acidic contaminants by contacting the gaseous feed with a membrane to obtain the hydrocarbonaceous feedstream and an acidic contaminants rich permeate.

2. The process according to claim 1, in which the feedstream has a temperature between –20 and 100° C.

3. The process according to claim 1, in which the acidic contaminants comprise one or more compounds selected from carbon dioxide and hydrogen sulphide.

4. The process according to claim 3, in which the feedstream comprises carbon dioxide in an amount between 10 and 95 vol % based on the total feedstream, and in which the feedstream comprises hydrogen sulphide in an amount between 0 and 45 vol % based on the total feedstream.

5. The process according to claim 3, in which the feedstream comprises hydrocarbons in an amount between 5 and 90 vol % based on the feedstream.

6. The process according to claim 1, in which the permeate obtained in step 2) has a pressure between 1 and 30 bara.

7. The process according to claim 1, in which the permeate in step 2) has an acidic contaminants content of >90 vol % based on the total retentate stream.

8. The process according to claim 1, in which the retentate in step 2) has a hydrocarbons content of between 40 and 80 vol % based on the total retentate stream.

9. The process according to claim 1, in which the permeate in step 3) has a pressure between 1 and 20 bara.

10. The process according to claim 1, in which the permeate in step 3) has an acidic contaminants content of between 40 and 90 vol % based on the total retentate stream.

11. The process according to claim 1, in which the retentate in step 3) has a hydrocarbons content of more than 90 vol %, based on the retentate.

12. A process for the removal of gaseous acidic contaminants from a gaseous hydrocarbonaceous feedstream comprising such gaseous acidic contaminants, the process comprising;
   1) providing the hydrocarbonaceous feedstream at a pressure between 30 and 120 bara, 2) contacting the hydrocarbonaceous feedstream with a membrane to obtain a hydrocarbon rich retentate and an acidic contaminants rich permeate,
3) contacting the hydrocarbon rich retentate obtained in step 2) with a second membrane to obtain a hydrocarbon rich retentate and an acidic contaminants rich permeate,
4) compressing the acidic contaminants rich permeate obtained in step 3) up till a pressure between 30 and 120 bara, and
5) mixing the compressed permeate obtained in step 4) with the feedstream of step 1)
in which the permeate in step 3) contains less than 10 vol % of acidic contaminants.

13. The process according to claim 1, comprising a pretreatment of the hydrocarbonaceous feedstream in order to remove water, the pretreatment being selected from a glycol treatment, a glycerol treatment or a molsieve treatment, the process optionally also comprising removal of C5+ compounds and/or C2-C4 compounds from the hydrocarbonaceous feedstream.

14. The process according to claim 1, wherein the process optionally also comprising removal of C5+ compounds and/or C2-C4 compounds from the hydrocarbonaceous feedstream.

15. The process according to claim 12, in which the acidic contaminants comprise one or more compounds selected from carbon dioxide and hydrogen sulphide.

16. The process according to claim 15, in which the feedstream comprises carbon dioxide in an amount between 10 and 95 vol % based on the total feedstream, and in which the feedstream comprises hydrogen sulphide in an amount between 0 and 45 vol % based on the total feedstream.

17. The process according to claim 12, in which the permeate obtained in step 2) has a pressure between 1 and 30 bara.

18. The process according to claim 12, in which the permeate in step 2) has an acidic contaminants content of >90 vol % based on the total retentate stream.

19. The process according to claim 12, in which the permeate in step 3) has an acidic contaminants content of between 40 and 90 vol% based on the total retentate stream.

20. The process according to claim 12, in which the retentate in step 3) has a hydrocarbons content of more than 90 vol %, based on the retentate.

* * * * *